United States Patent
Morino et al.

[11] Patent Number: 5,172,158
[45] Date of Patent: Dec. 15, 1992

[54] SHUTTER FOR A SINGLE LENS REFLEX CAMERA

[75] Inventors: Yukio Morino; Shigeru Tagami; Atsushi Takami, all of Yotsukaido, Japan

[73] Assignee: Seikosha Co., Ltd., Japan

[21] Appl. No.: 286,995

[22] Filed: Dec. 20, 1988

[30] Foreign Application Priority Data

Dec. 28, 1987 [JP] Japan .................. 62-198972[U]

[51] Int. Cl.[5] .................................. G03B 7/08
[52] U.S. Cl. .......................... 354/435; 354/439
[58] Field of Search ............ 354/435, 436, 437, 438, 354/439, 440

[56] References Cited

U.S. PATENT DOCUMENTS

| | | | |
|---|---|---|---|
| 3,903,528 | 9/1975 | Kee | 354/437 |
| 3,952,312 | 4/1976 | Douglas | 354/436 |
| 4,176,929 | 12/1979 | Ito et al. | 354/436 |
| 4,494,846 | 1/1985 | Kurosu et al. | 354/435 |

Primary Examiner—Russell E. Adams
Attorney, Agent, or Firm—Bruce L. Adams; Van C. Wilks

[57] ABSTRACT

A camera shutter of the type in which a shutter blade is initially displaced from an open position, in which a shutter opening is open, to a closed position, in which the shutter opening is closed, prior to the exposure-taking operation includes an actuating member displaceable in shutter-opening and shutter-closing directions to actuate the shutter blade in opening and closing directions. A drive motor effects displacement of the actuating member in the shutter-opening and shutter-closing directions, and a biasing spring biases the actuating member in the shutter-opening direction thereby preventing accidental closing of the shutter blade in the event impacts are applied to the camera. A detection switch detects when the shutter blade is in the open position, the switch being responsive to displacement of the actuating member in the shutter-opening direction to detect the open position of the shutter opening.

4 Claims, 2 Drawing Sheets

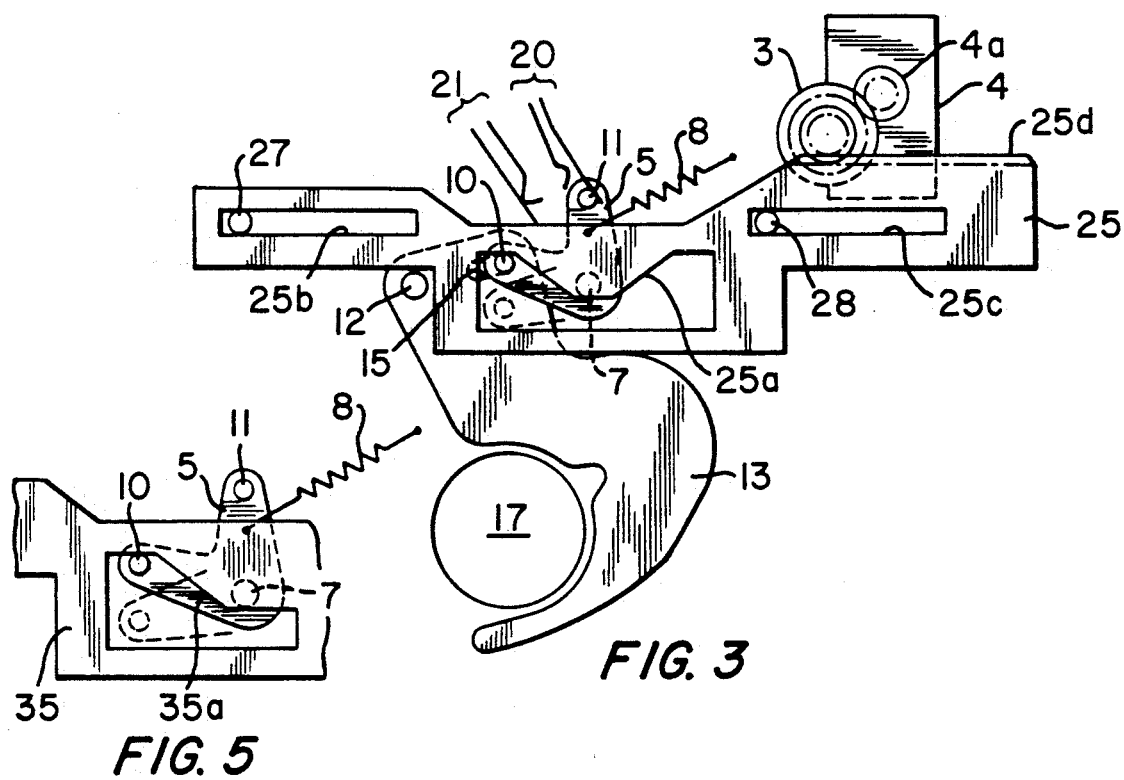
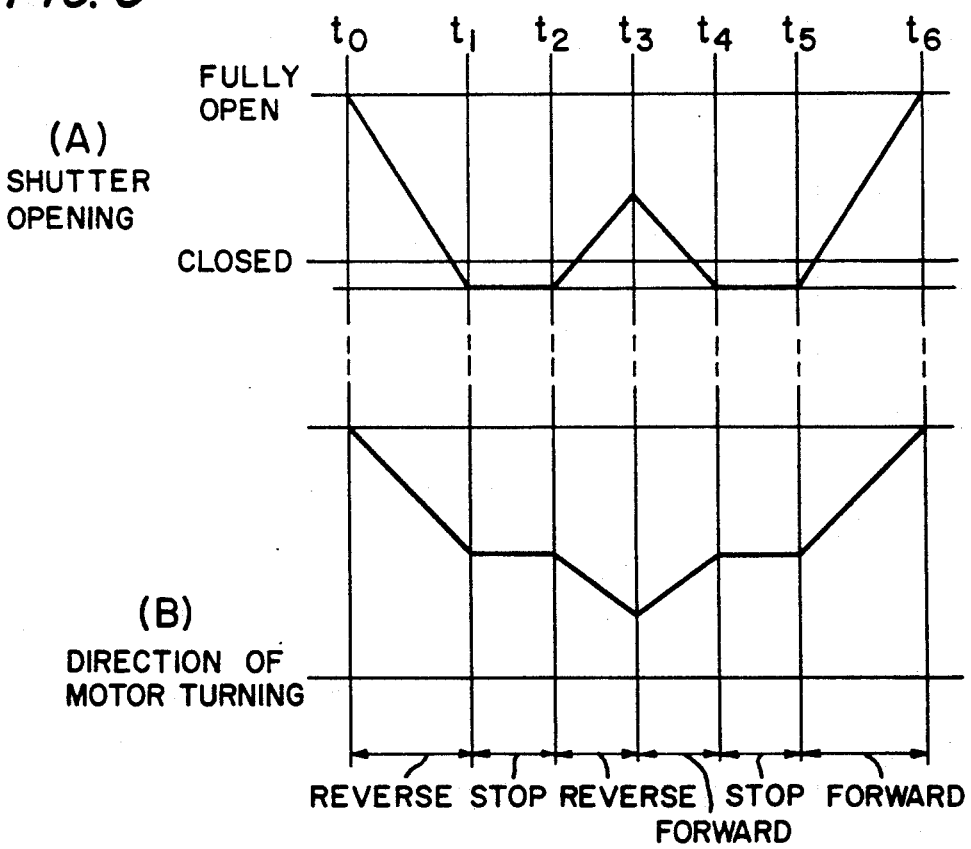

SHUTTER FOR A SINGLE LENS REFLEX CAMERA

BACKGROUND OF THE INVENTION

The present invention relates to a shutter for a single lens reflex camera for measuring the luminance of an object through the camera lens with the shutter opening being temporarily opened and, more particularly, to a shutter for effecting an exposure by actuating the shutter blade by the action of a drive motor.

A shutter for a single lens reflex camera according to the prior art is described, for example, in the specification of the Japanese Patent Application No. 62-202162 of the same applicant.

The shutter for the single lens reflex camera according to this application measures the luminance of an object through the camera lens with its opening being temporarily opened and then once closes the shutter opening in response to a releasing operation to retract the mirror and the shielding plane to a photographic position. After this, the shutter blade is opened and closed to effect the exposure, and a series of operations are ended again with the shutter opening being opened after the mirror and the shielding plate are restored their initial positions.

In this shutter for the single lens reflex camera of the prior art, however, the actuating member for actuating the shutter blade to open or close the shutter opening is always biased by a spring in a direction to close the shutter blade. At the same time, in order that the shutter opening may be kept open at the start and end of the shutter, a retaining member retains the actuating member to prevent the shutter blade from being closed. As a result, the camera may have its retaining member accidently released, if an impact is applied to the camera, by the shock of the impact. In this case, there arises a problem that a photometric result becomes erroneous to make the proper exposure impossible.

Moreover, the retaining member for blocking the actuation of the actuating member in the closing direction is required for holding the shutter blade in the open position, and the use of such a retaining member is disadvantageous in that the number of parts is increased.

SUMMARY OF THE INVENTION

It is, therefore, an object of the present invention to solve the above-specified problems and to provide a shutter for a single lens reflex camera, which is freed from having its shutter blade easily closed, even if an impact is applied thereto, while reducing the number of parts, by biasing the aforementioned actuating member at all times in a direction to open the shutter blade.

In order to achieve the above-specified object, the present invention is constructed by comprising, in a camera shutter for effecting an exposure by means of a drive motor after a shutter opening is once closed from its open state in response to a releasing operation: an actuating member for actuating a shutter blade, when driven by said drive motor, to open or close the shutter opening; a spring for biasing the actuating member in a direction to open the shutter opening; and detecting means for detecting the state in which the shutter opening is opened by the action of said actuating member.

BRIEF DESCRIPTION OF THE DRAWINGS

FIG. 1 being a front elevation of the shutter and FIGS. 2(A) and 2(B) being timing charts illustrating the opened and closed states of the shutter opening and the rotating directions of the drive motor, respectively.

FIGS. 3 and 4 are diagrams showing a second embodiment of a shutter for a single lens reflex camera according to the present invention: FIG. 3 being a front elevation of the shutter and FIGS. 4(A) and 4(B) being timing charts illustrating the opened and closed states of the shutter opening and the rotating directions of the drive motor, respectively.

FIG. 5 is a front elevation showing an essential portion of a third embodiment of a shutter for a single lens reflex camera according to the present invention.

DETAILED DESCRIPTION OF INVENTION

Figure 1:
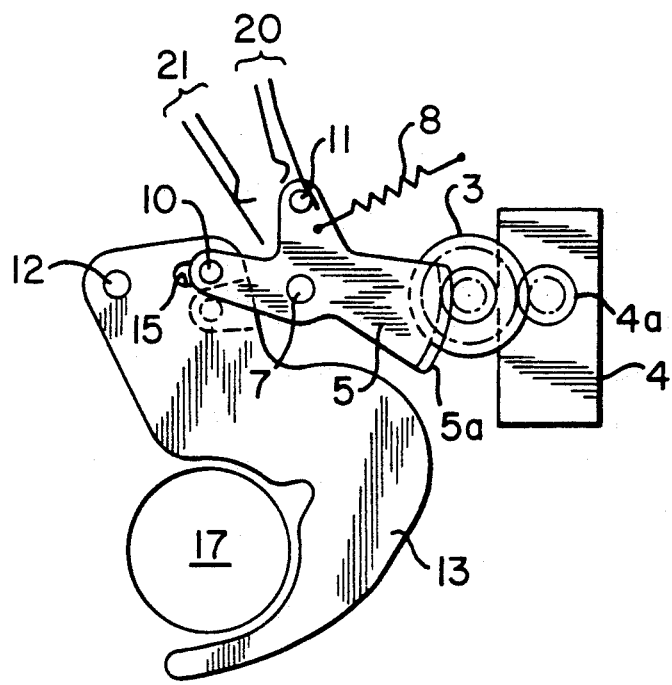
FIGS. 1 and 2 are diagrams showing a first embodiment of a shutter for a single lens reflex camera according to the present invention.
Figure 2:
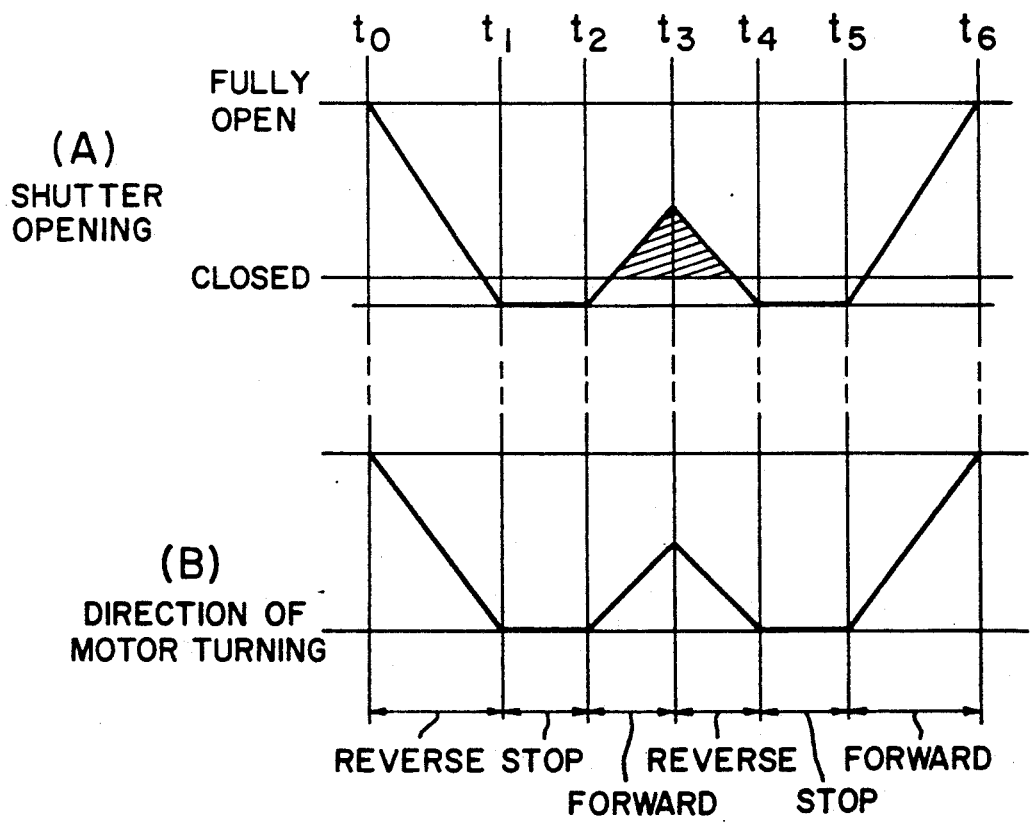

The present invention will be described in the following in connection with the embodiments thereof with reference to the accompanying drawings. FIGS. 1 and 2 are diagrams showing a first embodiment of a shutter for the single reflex camera according to the present invention.

In FIG. 1, reference numeral 4 designates a drive motor having a pinion 4a. This drive motor 4 is controlled to switch its forward and backward rotations by a well-known electronic circuit. The pinion 4a meshes with the larger-diameter portion of an idler pinion 3, the smaller-diameter portion of which in turn meshes with the toothed portion 5a of an actuating member 5. This actuating member 5 is rotatably borne through a pin 7 on a stationary base which is arranged at the back of the drawing and is always biased clockwise, as seen, by a tension spring 8 which is interposed between itself and the stationary base.

The actuating member 5 is equipped with pins 10 and 11, respectively, at the leading ends of its two arms which are located at the opposite side of the actuating member 5 from the toothed portion 5a. The pin 10 engages with a slot 15 formed in a shutter blade 13, which in turn is rotatably mounted on the stationary base through a pin 12. The shutter opening 17 can be opened or closed by turning the shutter blade 13. Incidentally, only one shutter blade 13 is shown to simplify the illustration and it is understood that a plurality of shutter blades can be used.

The pin 11 is brought into contact with a switch 20 (i.e., detecting means) to operate it, when the actuating member 5 is turned clockwise, as shown in FIG. 1, and the pin 11 is brought into contact with a switch 21 to operate it when the actuating member 5 is turned counter-clockwise.

In the shutter for the single lens reflex camera thus constructed, the luminance of an object is measured by reflecting light from a it on mirror (not shown) through the camera lens, as in the state shown in FIG. 1, and an electronic circuit (not shown) is then energized for photography from a power source by operating the release of the camera. Then, the drive motor 4 rotates its pinion 4a counter-clockwise. Then, the idler pinion 3 is rotated clockwise so that its smaller-diameter portion rotates the actuating member 5 counter-clockwise through the toothed portion 5a. At this time, the shutter blade 13 is rotated clockwise in the shutter-closing direction on the pin 12 through the slot 15 by the pin 10 so that the shutter blade 13 closes the shutter opening 17 (at $t_0$ to $t_1$ of FIG. 2). In the meanwhile, the pin 11 comes into contact with the switch 21 to operate it. Then, the switch 21 detects that the shutter opening 17 is closed, and outputs a signal to the electronic circuit so that the electronic circuit stops the drive motor 4. When a predetermined time elapses after operation of the switch 21 or when the drive motor 4 is stopped, the mirror and shielding plate are retracted (at $t_1$ to $t_2$ of FIG. 2) to their photographic positions (outside of the photographic optical path) by the output of the electronic circuit at the side of the camera. Then, the pinion 4a of the drive motor 4 is switched to start its forward rotations in the clockwise direction by the electronic circuit. As a result, the shutter blade 13 is turned counter-clockwise in the shutter-opening direction on the pin 12 through the idler pinion 3, the actuating member 5, the pin 10 and the slot 15 to open the shutter opening 17 gradually until the degree of opening reaches (at $t_2$ to $t_3$ of FIG. 2) a value corresponding to the object luminance as a result of the arithmetic operation of photometry stored in the electronic circuit. Then, the pinion 4a switches its rotating direction so that the shutter blade 13 closes again the shutter opening 17 (at $t_3$ to $t_4$ of FIG. 2).

When the exposing operation is thus ended, the pin 11 comes again into contact with the switch 21 so that the electronic circuit stops the drive motor 4. When a predetermined time elapses after actuation of the switch 21 or when the drive motor 4 is stopped, the mirror and the shielding plate are restored their initial positions (inside of the photographic optical path) (at $t_4$ to $V_5$ of FIG. 2) in response to the output of the electronic circuit at the camera side. Then, The pinion 4a of the drive motor 4 rotates again forward or clockwise to bring the shutter opening 17 into its open state, thus ending a series of operations (at $t_5$ to $t_6$ of FIG. 2).

When the drive motor 4 is deenergized, the pinion 4a loses its rotating force so that the actuating member 5 is resiliently tensed by the tension or biased spring 8 to turn clockwise to bring the shutter blade 13 into the fully open (or released) state of the shutter opening 17 through the pin 10 and the slot 15. At this time, the pin 11 comes into contact with the switch 20 to operate it so that the switch 20 detects that the shutter opening 17 is again in its fully open state. When the electronic circuit is energized again, the shutter 20 can output the signal to the electronic circuit.

Thus in the first embodiment, the actuating member 5 is always biased in the direction to open the shutter opening 17 by the action of the tension spring 8. As a result, the shutter blade 13 is prevented from closing the shutter opening 17 easily even if an impact is applied to the camera. Moreover, the retaining member of the prior art for retaining the shutter blade 13 in the direction to open the shutter blade 17 can be dispensed with to reduce the number of parts.

If, on the other hand, the switch 20 fails to detect the fully open state of the shutter opening 17 when the well-known electronic circuit is connected with the power source by the releasing operation, the electronic circuit rotates the pinion 4a of the drive motor 4 forward or clockwise to bring the shutter opening 17 into the fully open state. In this state, the luminance of the object is measured, and the aforementioned series operations are accomplished. As a result, even if the shutter opening 17 should be slightly closed by the impact applied to the camera, the camera can be started after the shutter blade 13 has been returned to its fully open normal state, thereby to prevent improper exposure which might otherwise be caused by the erroneous photometry of the luminance of the object.

FIGS. 3 and 4 show a second embodiment of the present invention. Although the foregoing first embodiment has the actuating member 5 turned directly by the idler pinion 3, the second embodiment is equipped with a drive member 25 which is interposed between the idler pinion 3 and the actuating member 5. Specifically, the actuating member 5 does not have a toothed portion and has the pins 10 and 11 at the leading end portions of its V-shaped arms. Of these, the pin 10 engages with not only the slot 15 like the first embodiment but also a cam portion 25a of the drive member 25. The drive member 25 has slots 25b and 25c fitted slidably on pins 27 and 28 anchored on the stationary base and has a rack 25d meshing with the smaller-diameter portion of the idler pinion 3 so that the drive member 25 can move to the right and left, as shown, along the slots 25b and 25c.

In the second embodiment thus constructed, the luminance of an object is measured in the state shown in FIG. 3 through the camera lens, and the electronic circuit (not shown) is connected for photography with the power source by the releasing operation of the camera. Then, the drive motor 4 rotates its pinion 4a backward, i.e., counter-clockwise. Then, the drive member 25 is moved leftwardly of the drawing through the rack 25d by the smaller-diameter portion of the idler pinion 3. At this time, the pin 10 is pushed downward of the drawing by the cam portion 25a so that the shutter blade 13 is turned clockwise through the slot 15 to close the shutter opening 17 (at $t_0$ to $t_1$ of FIG. 4). At this time, the pin 11 comes into contact with the switch 21 to operate it so that the switch 21 detects that the shutter opening 17 is closed, and outputs a detection signal to the electronic circuit to stop the drive motor 4. When a predetermined time elapses after actuation of the switch 21 or when the drive motor 4 is stopped, the mirror and shielding plane are retracted (at $t_1$ to $t_2$ of FIG. 4) to their photographic positions (outside of the optical path) by the output of the electronic circuit at the side of the camera. The pinion 4a of the drive motor 4 further continues its backward rotations to bring the drive member 25 farther leftwardly of the drawing. As a result, the pin 10 is pulled upward of the drawing along the cam portion 25a by the tension spring 8 so that the shutter blade 13 opens the shutter opening 17 gradually. When the degree of opening is caused to reach (at $t_2$ to $t_3$ of FIG. 4) the value corresponding to the object luminance by the computed result of the photometry stored in the electronic circuit, the rotating direction of the pinion 4a is switched forward to move the drive member 25 rightwardly of the drawing. As a result, the pin 10 is pushed down along the cam portion 25a so that the shutter blade 13 closes the shutter opening 17 (at $t_3$ to $t_4$ of FIG. 4).

When the exposing operation is thus ended, the pin 11 comes again into contact with the switch 21 so that the electronic circuit stops the drive motor 4. When, on the other hand, a predetermined time elapses after actuation of the switch 21 or when the drive motor 4 is stopped, the mirror and the shielding plate are restored (at $t_4$ to $t_5$ of FIG. 4) to their initial positions (outside of the photographic optical path) in response to the output of the electronic circuit at the side of the camera, the pinion 4a of the drive motor 4 further continues its forward rotations to move the drive member 25 rightwardly of the drawing. Then, the pin 10 is pulled upward along the cam portion 25a to turn the shutter blade 13 so that the shutter opening 17 is brought into its open state to end the series operations (at $t_5$ to $t_6$ of FIG. 4).

FIG. 5 shows a third embodiment of the present invention. In the foregoing second embodiment, the pin 10 make one vertical reciprocation by the cam portion 25a while the drive member 25 is moving rightwardly or leftwardly of the drawing. In this third embodiment, on the contrary, a drive member 35 has its cam portion 35a formed to have a size half as large as that of the cam portion 25a of the drive member 25 of the second embodiment. This makes it difficult to reciprocate the drive member 35, too, to the right and left of the drawing so as to effect the one vertical reciprocation of the pin 10 of the actuating member 5. As a result, the pinion 4a of the drive motor 4 accomplishes a series of operations by switching the rotating directions twice like the foregoing first embodiment. Thus, the timings for opening or closing the shutter opening 17 and for switching the rotating directions of the drive motor 4 are similar to those of FIG. 2. According to this third embodiment, the drive member 35 can be made smaller than that of the drive member 25 of the second embodiment.

The drive motor 4 can be a step motor, an ultrasonic motor or the like but may be another if its rotations can be controlled forward or backward, if desired, by the electronic circuit.

The cam portions of the foregoing second and third embodiments may be grooves. In these modifications, the shutter blade can be opened or closed without fail through the pin.

As has been described hereinbefore, according to the present invention, the shutter is not easily closed even if an impact should be applied to the camera. If closed, erroneous exposures can be prevented because a series operations are performed once the shutter is fully opened for the photometry.

In contrast to the prior art, moreover, the retaining member for retaining the actuating member to keep the shutter opening fully open can be eliminated so that the number of parts can be reduced and the production cost lowered.

What is claimed is:

1. In a camera shutter of the type in which a shutter blade is initially displaced from an open position in which a shutter opening is open to a closed position to close the shutter opening prior to effecting an exposure; a displaceable actuating member displaceable in shutter-opening and shutter-closing directions to actuate the shutter blades in opening and closing directions; driving means for displacing the actuating member in the shutter-opening and shutter-closing directions; biasing means for resiliently biasing the actuating member in the shutter-opening direction, the biasing means comprising a spring connected to resiliently bias the actuating member in the shutter-opening direction; and detecting means for detecting when the shutter blade is in the open position, the detecting means comprising means responsive to displacement of the actuating member in the shutter-opening direction for detecting when the shutter blade is in the open position, the means responsive to displacement comprising an actuatable switch having two switching states, the switch being positioned to be actuated from one switching state to the other switching state in response to displacement of the actuating member in the shutter-opening direction.

2. A camera shutter according to claim 1; wherein the driving means includes a bi-directional drive motor.

3. In a camera shutter of the type in which a shutter blade is initially displaced from an open position in which a shutter opening is open to a closed position to close the shutter opening prior to effecting an exposure; a displaceable actuating member displaceable in shutter-opening and shutter-closing directions to actuate the shutter blade in opening and closing directions; driving means for displacing the actuating member in the shutter-opening and shutter-closing directions; biasing means for resiliently biasing the actuating member in the shutter-opening direction; and detecting means for detecting when the shutter blade is in the open position, the detecting means comprising means responsive to displacement of the actuating member in the shutter-opening direction for detecting when the shutter blade is in the open position, the means responsive to displacement comprising an actuatable switch having two switching states, the switch being positioned to be actuated from one switching state to the other switching state in response to displacement of the actuating member in the shutter-opening direction.

4. A camera shutter according to claim 3, wherein the driving means includes a bi-directional drive motor.

* * * * *